(12) United States Patent
Dettinger et al.

(10) Patent No.: US 7,890,519 B2
(45) Date of Patent: Feb. 15, 2011

(54) SUMMARIZING DATA REMOVED FROM A QUERY RESULT SET BASED ON A DATA QUALITY STANDARD

(75) Inventors: Richard Dean Dettinger, Rochester, MN (US); Frederick Allyn Kulack, Rochester, MN (US); Kevin Glynn Paterson, San Antonio, TX (US); Shannon Everett Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 11/860,814

(22) Filed: Sep. 25, 2007

(65) Prior Publication Data

US 2009/0083224 A1 Mar. 26, 2009

(51) Int. Cl.
| | |
|---|---|
| *G06F 7/00* | (2006.01) |
| *G06F 17/30* | (2006.01) |
| *G06F 17/00* | (2006.01) |
| *G06F 17/20* | (2006.01) |
| *G06F 17/21* | (2006.01) |
| *G06F 17/22* | (2006.01) |
| *G06F 17/24* | (2006.01) |
| *G06F 17/25* | (2006.01) |
| *G06F 17/26* | (2006.01) |
| *G06F 17/27* | (2006.01) |
| *G06F 17/28* | (2006.01) |

(52) U.S. Cl. .................... 707/752; 707/754; 707/757; 715/200

(58) Field of Classification Search .................. 715/200; 707/3, 752, 754
See application file for complete search history.

(56) References Cited

U.S. PATENT DOCUMENTS

| | | | | | |
|---|---|---|---|---|---|
| 5,299,305 | A | * | 3/1994 | Oomae et al. | 715/200 |
| 5,652,881 | A | * | 7/1997 | Takahashi et al. | 382/162 |
| 6,014,664 | A | * | 1/2000 | Fagin et al. | 707/694 |
| 6,578,026 | B1 | * | 6/2003 | Cranston et al. | 707/696 |
| 7,340,447 | B2 | * | 3/2008 | Ghatare | 707/754 |
| 7,596,751 | B2 | * | 9/2009 | Rowson et al. | 715/255 |
| 7,705,856 | B2 | * | 4/2010 | Tanaka et al. | 345/593 |
| 2004/0163039 | A1 | * | 8/2004 | Gorman | 715/505 |
| 2005/0240592 | A1 | * | 10/2005 | Mamou et al. | 707/9 |
| 2006/0100974 | A1 | * | 5/2006 | Dieberger et al. | 707/1 |
| 2006/0242554 | A1 | * | 10/2006 | Gerace et al. | 715/501.1 |

* cited by examiner

*Primary Examiner*—Charles E Lu
(74) *Attorney, Agent, or Firm*—Patterson & Sheridan, LLP

(57) ABSTRACT

A method, article of manufacture and apparatus for graphically summarizing the data in an initial query result set, including when rows are removed from the result set by applying a data quality standard is disclosed. When a user selects to change the data quality standard, a group of target rows are identified and removed from the user's display. A bitmap is generated to graphically represent the location of each row in the initial result set, including removed rows. A bitmap to summarize the data values for one or more columns in the initial result set may also be created. Thus, a user may quickly obtain an intuitive view of what the data looks like, without the need for complex analysis or graphing packages.

21 Claims, 6 Drawing Sheets

200

| PATIENT ID | LAST NAME | GENDER | AGE | HCT % BLD | DATA STANDARD |
|---|---|---|---|---|---|
| 5999 | SMITH | MALE | 35 | 15 | GOLD |
| 5998 | MOORE | FEMALE | 70 | 15.2 | GOLD |
| 5997 | STONE-MILLS | MALE | 5 | 15.4 | GOLD |
| 5992 | O'BRIAN | MALE | 102 | 4.8 | SILVER |
| 5991 | KLEIN | FEMALE | 101 | 18 | GOLD |
| 5990 | TAYLOR | FEMALE | 37 | 31 | GOLD |
| 5989 | WHITE | FEMALE | 62 | 4.9 | SILVER |
| 5988 | BROWN | FEMALE | 28 | 5 | SILVER |
| 5988 | BROWN | FEMALE | 28 | 5.1 | NONE |
| 5982 | CARTER | MALE | 68 | 16 | GOLD |
| 5980 | JONES | FEMALE | 29 | 5.2 | NONE |
| 5980 | JONES | FEMALE | 29 | 5.3 | NONE |
| 5977 | FRANKS | MALE | 78 | 17 | GOLD |
| 5976 | THOMPSON | FEMALE | 58 | 5.4 | SILVER |
| 5975 | HARRIS | FEMALE | 67 | 18 | GOLD |
| 5969 | THOMPSON | MALE | 23 | 5.5 | SILVER |
| 5967 | CARTER | FEMALE | 15 | 5.6 | NONE |
| 5966 | HACKMAN | FEMALE | 37 | 5.7 | SILVER |
| 5964 | FRANKS | FEMALE | 82 | 7.4 | GOLD |
| 5963 | HALL | MALE | 35 | 6.1 | GOLD |
| 5960 | MARTINEZ | MALE | 35 | 5.8 | SILVER |
| 5952 | RIVAS | FEMALE | 14 | 25 | GOLD |
| 5950 | HANKS | FEMALE | 101 | 18 | GOLD |
| 5950 | HANKS | FEMALE | 101 | 5.9 | SILVER |
| 5949 | HARRIS | MALE | 71 | 6 | SILVER |

FIG. 2

305 — Query Results

Data Standard  ⦿ All  ○ Silver  ○ Gold

| Results | Alternate Output Formats |
|---|---|
| 1 - 10 of 25 | CSV - CSV for Excel - Tab Delimited - XML |

Result Page: 1  2  3  4  5  6  7  8  9  10...  Last

| Patient ID | Last Name | Gender | Age | Hct % Bld |
|---|---|---|---|---|
| 5999 | Smith | Male | 35 | 15 |
| 5998 | Moore | Female | 70 | 15.2 |
| 5997 | Stone-Mills | Male | 5 | 15.4 |
| 5992 | O'Brian | Male | 102 | 4.8 |
| 5991 | Klein | Female | 101 | 18 |
| 5990 | Taylor | Female | 37 | 31 |
| 5989 | White | Female | 62 | 4.9 |
| 5988 | Brown | Female | 28 | 5 |
| 5988 | Brown | Female | 28 | 5.1 |
| 5982 | Carter | Male | 68 | 16 |

Result Page: 1  2  3  4  5  6  7  8  9  10...  Last

Query Results — 410

Legend:
- ■ Removed Rows
- ☐ Rows Still Present
- ☐ Block Size ( 1 row )

Data Standard
- ○ All
- ○ Silver
- ⦿ Gold  — 405

Results — 1 - 10 of 12 remaining

Alternate Output Formats: CSV - CSV for Excel - Tab Delimited - XML

Result Page: 1 2 3 4 5 6 7 8 9 10... Last row 1

| Patient ID | Last Name | Gender | Age | Hct % Bld |
|---|---|---|---|---|
| 5999 | Smith | Male | 35 | 15 |
| 5998 | Moore | Female | 70 | 15.2 |
| 5997 | Stone-Mills | Male | 5 | 15.4 |
| 5991 | Klein | Female | 101 | 18 |
| 5990 | Taylor | Female | 37 | 31 |
| 5982 | Carter | Male | 68 | 16 |
| 5977 | Franks | Male | 78 | 17 |
| 5975 | Harris | Female | 67 | 18 |
| 5964 | Franks | Female | 82 | 7.4 |
| 5963 | Hall | Male | 35 | 6.1 | row 25

Result Page: 1 2 3 4 5 6 7 8 9 10... Last

SUMMARIZING DATA REMOVED FROM A QUERY RESULT SET BASED ON A DATA QUALITY STANDARD

BACKGROUND OF THE INVENTION

1. Field of the Invention

The present invention generally relates to data processing and computer database systems. More particularly, embodiments of the invention are related to graphically summarizing data removed from a query result set, based on a data quality standard.

2. Description of the Related Art

Databases are computerized information storage and retrieval systems. A relational database management system (RDBMS) is a computer database management system that uses relational techniques for storing and retrieving data. Relational databases are computerized information systems in which data in the form of rows, columns and tables are typically stored on disk drives or similar mass data stores. A database schema is used to specify data is stored in a collection of tables and how the tables are related to one another. Each database table includes a set of rows (also referred to as records) spanning one or more columns.

A database query refers to a set of commands or clauses for retrieving data stored in a database. Database queries may come from users, application programs, or remote systems. A query may specify which columns to retrieve data from, how to join columns from multiple tables, and conditions that must be satisfied for a particular data record to be included in a query result set. Current relational databases typically process queries composed in an exacting format specified by a query language. For example, the widely used query language SQL (short for Structured Query Language) is supported by virtually every database available today.

In some cases the quality of data in a table may vary. For example, the data in one row may not be as accurate or reliable as the data in another row. It is desirable to expose these qualitative differences to users in some cases.

SUMMARY OF THE INVENTION

Embodiments of the present invention generally provide for a graphical summary view of data from all of the rows in an initial query result set, including when rows are removed from the initial result set by applying a data quality standard.

One embodiment of the invention includes a computer-implemented method of graphically summarizing data in a query result. The method may generally include receiving a query result set. The query result set may include a plurality of rows and a value for a data quality standard assigned to each row. The method may also include receiving a request to remove rows containing data that fails to satisfy a specified value for the data quality standard, removing one or more rows from the query result, where the assigned value for each removed row fails to satisfy the specified value for the data quality standard. The method may also include generating and displaying a summarization bitmap. The summarization bitmap may include a plurality of blocks each representing one or more rows of the query result set and a color of each block may indicate whether the corresponding one or more rows are displayed or were removed from the query result set based on the data quality standard.

Another embodiment of the invention includes a computer-readable medium containing a program which, when executed, performs an operation for graphically summarizing data in a query result set. The operation may generally include receiving a query result set, where the query result set includes a plurality of rows and a value for a data quality standard assigned to each row. The operation may further include receiving a request to remove rows containing data that fails to satisfy a specified value for the data quality standard, and removing one or more rows from the query result, where the assigned value for each removed row fails to satisfy the specified value for the data quality standard. The operation may further include generating and displaying a summarization bitmap. The summarization bitmap includes a plurality of blocks each representing one or more rows of the query result set and a color of each block may indicate whether the corresponding one or more rows are displayed or were removed from the query result set based on the data quality standard.

Still another embodiment of the invention includes a system having a database; a processor; and a memory containing a database program, which when executed on the processor, performs an operation for graphically summarizing data in a query result. The operation may generally include receiving a query result set, where the query result set includes a plurality of rows and a value for a data quality standard assigned to each row. The operation may further include receiving a request to remove rows containing data that fails to satisfy a specified value for the data quality standard, and removing one or more rows from the query result, where the assigned value for each removed row fails to satisfy the specified value for the data quality standard. The operation may further include generating and displaying a summarization bitmap. The summarization bitmap includes a plurality of blocks each representing one or more rows of the query result set and a color of each block may indicate whether the corresponding one or more rows are displayed or were removed from the query result set based on the data quality standard.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is a block diagram illustrating a sample result set, according to one embodiment of the invention.

FIG. 3 is a block diagram illustrating data from the result set displayed in a query interface with no data standard applied to the result set, according to one embodiment of the invention.

FIG. 4 is a block diagram illustrating data from the result set displayed in the query interface with a "gold" data standard applied to the result set, according to one embodiment of the invention.

DETAILED DESCRIPTION OF THE PREFERRED EMBODIMENTS

Figure 1:
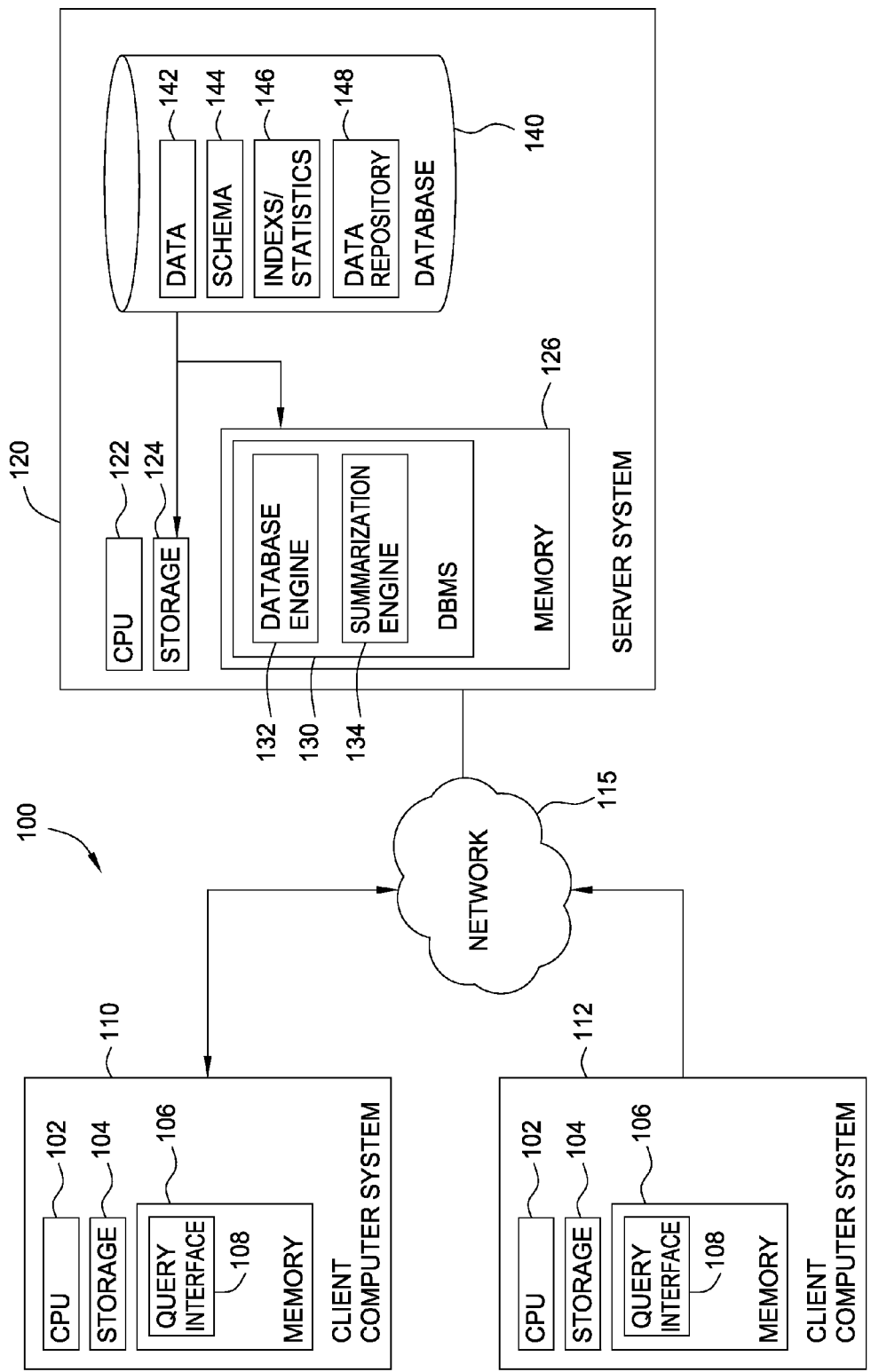
FIG. 1 is a block diagram illustrating a client server view of a computing environment and database system, according to one embodiment of the invention.

One way to track the quality of data is to implement the concept of data standards. For example, data in a particular row could be assigned one of three standards: gold, silver, and none. The standards may generally indicate whether certain quality control or data cleansing has occurred on the data. Standard requirements can be applied to a query or used to modify the presentation of result rows. For example, one user may only be interested in gold standard data, whereas another user may be interested in both gold and silver standard data. Yet another user may decide to research all data, regardless of any data standard.

One issue faced when reviewing and analyzing the results of a query is the difficulty in obtaining an intuitive understanding of the data, because the query result set may contain hundreds or thousands of rows. For example, a user may have a set of results that includes 1000 rows. If 10 rows per page are displayed, then there would be 100 pages of data. Assume 200 of the rows in the result set do not meet gold or silver standard. If the user changes the minimum data quality selection criteria from "none" to "silver," 200 rows would be removed from the result set. Even though the removed rows do not meet the "silver" standard, and are no longer displayed, the user may still want to know how the data in the 200 removed rows relates to the data in the remaining 800 rows. Further, in the general case (not considering data quality standards), it would be useful for a user to obtain a quick intuitive view of what the data looks like throughout the entire result set.

Embodiments of the present invention allow a user to quickly obtain a high-level summarization of data in a query result set, including a summarization of rows that have been removed from the result set. For example, after a data quality standard has been used to remove rows from the result set that fail to meet the quality standard. In one embodiment, a summary bitmap may be generated to convey a variety of information related to query results. Summary bitmaps provide an efficient way to observe correlations between removed rows and values or between values of various columns. By using various colors and shading, the bitmaps provide an intuitive representation of data that is both useful and easy to read. Furthermore, by sorting query results differently, multiple versions of bitmaps can be created and compared to each other, providing immediate insights into rows removed from the query result.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes two client computer systems 110 and 112, a network 115 and a server system 120. The computer systems 110, 112, and 120 illustrated in environment 100 are included to be representative of existing computer systems, e.g., desktop computers, server computers laptop computers, tablet computers and the like. However, embodiments of the invention are not limited to any particular computing system, application or network architecture and may be adapted to take advantage of new computing systems as they become available. Additionally, those skilled in the art will recognize that the computer systems illustrated in FIG. 1 are simplified to highlight aspects of the present invention and that computing systems and networks typically include a variety of additional elements not shown in FIG. 1.

As shown, client computer systems 110 and 112 each include a CPU 102, storage 104 and memory 106, typically connected by a bus (not shown). CPU 102 is a programmable logic device that performs all the instructions, logic, and mathematical processing performed in executing user applications (e.g., a query interface 108). Storage 104 stores application programs and data for use by client computer systems 110 and 112. Storage 104 includes hard-disk drives, flash memory devices, optical media and the like. Network 115 generally represents any kind of data communications network. Accordingly, network 115 may represent both local and wide area networks, including the Internet. Client computer systems 110 and 112 also include a query interface 108. In one embodiment, query interface 108 is a software application that allows end users to access information stored in a database (e.g., database 140). In one embodiment, query interface 108 may be an application within a web browser or other program that accesses the World Wide Web. Query interface 108 may allow users to compose and submit a query to a database management system, which, in response, may be configured to process the query and return a set of query results.

In one embodiment, the query interface allows users to compose a database query without requiring that the user also be familiar with the underlying database query language (e.g., SQL). In such a case, the query interface 108 may be configured to generate a query in the underlying query language based on input provided by a user.

Server 120 includes a CPU 122, storage 124 and memory 126. As shown, server computer 120 also includes a database management system (DBMS) 130 that includes a query engine 132 and a summarization engine 134. The DBMS 130 includes software used to access, search, organize, analyze, and modify information stored in database 140, along with mechanisms for performing other database functions. The query engine 132 may be configured to process database queries submitted by a requesting application (e.g., a query generated using query interface 108) and to return a set of query results to the requesting application. In one embodiment, the summarization engine 134 processes the data from the query to create a summarization bitmap. Alternatively, query interface 108 may be configured to organize results and generate a summary bitmap. The query interface 108 may be configured to display the summarization bitmaps along with the query results.

Database 140 stores the data managed by DBMS 130. At various times, elements of database 140 may be present in storage 124 and memory 126. In one embodiment, database 140 includes data 142, schema 144 and indexes/statistics 146. Data 142 represents the substantive data stored by database 140. Schema 144 provides a description of how the data 142 is represented and organized within a database 140. For a relational database, the schema 144 specifies the tables, columns, and relationships between tables. In addition, schema 144 may specify the data types of columns in a table and any constraints on a table or column. Index/statistics 146 may include various elements of metadata regarding database 140 and may be used in conjunction with schema 144 to optimize a query to more efficiently run on the database 140.

The data repository 148 may be used to store information regarding fields/columns, such as the limits that are used by the summarization engine 134 to calculate discrete values (categories) when generating summarization bitmaps. For example, to calculate a summary bitmap for an "age" column, the data repository may specify three categories: child (0-17), adult (18-55), and senior (over 56). After applying a "gold" standard to the result set, a researcher may compare the missing row bitmap to the age bitmap. By comparing the two summarization bitmaps, a researcher may easily discover if a disproportionate number of rows for children were removed from the result set.

FIG. 2 is a block diagram illustrating a sample result set, according to one embodiment of the invention. In this example, the result set 200 includes 25 rows of patient data. The data columns include patient ID, last name, gender, age, Hct % Bid (blood count), and data standard (the data quality). If a patient had their blood count measured in accordance with certain quality standards, then there may be a value of "gold" or "silver" in the data standard column. Conversely, if no quality standards were used when the patient's blood count was taken, then the data standard column will have a value of "none." The result set 200 is used to illustrate aspects of the invention in the following figures.

FIG. 3 is an example of a screen shot 300 illustrating data from the result set of FIG. 2, as displayed in a query interface, without a data standard used to constrain what rows of the result set are displayed, according to one embodiment of the invention. As shown, the query interface displays ten rows of data per page. Illustratively, the user has selected a data standard of "All" using a radio button 305. Since no data standard is applied to the data, all twenty-five rows remain in the results. The user can view the remaining rows of data by going to the second and third pages.

FIG. 4 is an example screen display 400 generated by a query interface, with the "gold" data standard used to constrain the result set, according to one embodiment of the invention. When the user chooses a data standard, the rows which do not meet the chosen data standard are removed. In this case, the number of displayed rows is reduced from twenty-five to twelve. The data standard summarization bitmap 402 displays a summary of the entire result set, including removed rows that do not meet the gold data standard. In this example, displayed rows are represented by the white areas of the bitmap, and removed rows are represented by black areas. A legend 410 indicates what color represents removed rows and rows that are still displayed. A graphical indicator 404 shows which rows are spanned by the current page. In this case, graphical indicator 404 spans the first ten rows out of twelve total rows in the results. In one embodiment, the interface may allow the user to sort the results. In such a case, the summarization engine 134 may be configured to regenerate the summarization bitmap 402 according to the new order of displayed and removed rows. For example, as shown, the rows are sorted in reverse order by patient ID, but the rows could also be sorted by last name.

The summarization bitmap 402 is useful for determining whether sample sizes are valid for the type of work to be done, based upon data standards. For example, a researcher may require a 50/50 ratio of men to women for a given research project. The researcher may use a sample result set that has this ratio. However, when the researcher applies a particular standard to a result set, the displayed rows might only contain 10% male data. The researcher might overlook the fact that only 10% is male data, which could ultimately invalidate the research. Embodiments of the invention make it easier to recognize this situation. When sorted by gender, summarization bitmap 402 changes to reflect the new location of the rows. In such a case, since female sorts above male, 90% of the top half of the bitmap would be white, whereas 90% of the bottom half would be black (indicating removed rows). This provides a clear and immediate visual indication that, when filtered using the chosen standard, very few males are in the result. The same process can be applied to other criteria, such as age or race.

Figure 5:
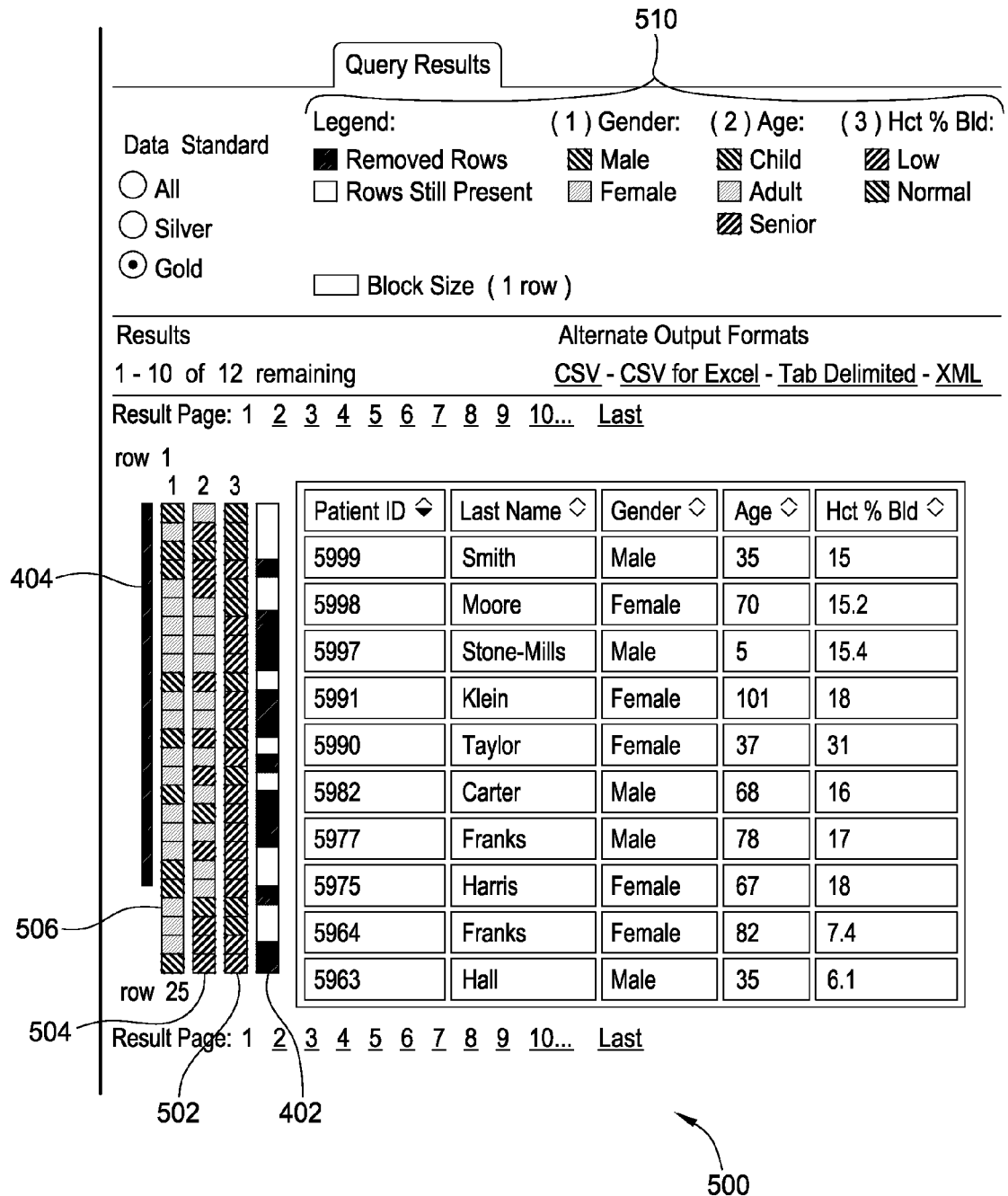
FIG. 5 is a block diagram illustrating data from the result set, as displayed in the query interface, with the "gold" data standard applied to the result set and with data value summarization for three columns, according to one embodiment of the invention.

FIG. 5 is an example screen display 500 generated illustrating data from result set 200 of FIG. 2, as displayed in the query interface, with data value summarization for three columns, according to one embodiment of the invention. Illustratively, the data value summarization bitmaps 502, 504, and 506 for the Gender, Age, and "Hct % Bid" columns, respectively, readily convey correlations between data and displayed/removed rows. That is, summarization bitmap 502 displays summarization data for removed rows relative to gender. Similarly, summarization bitmap 504 displays summarization data for removed rows relative to age, and summarization bitmap 506 displays summarization data for removed rows relative to an HCT % (either "low" or "normal"). Legend 510 indicates what color represents removed rows and what color represents rows that are still displayed. For example, the summarization bitmap 402 shows a strong correlation between the removed rows 402 and low HCT 502, as many of the removed rows 402 have data related to a patient with a low HCT count. There is a less strong correlation between removed rows 402 and age 502.

In one embodiment, when a very large number of rows is displayed, the block size becomes physically smaller (down to a physical pixel in height), but may represent a larger number of physical rows. The summarization bitmap is well suited for this type of representation. Bitmaps can be rendered with a smooth range of color, corresponding to the relative number of records affected, or the statistical nature of the data. For example, if the block size is 200 rows, and 50 of the rows are removed, a 75% grayscale could represent the block.

Further, in one embodiment, when there are a large number of rows per block or pixel, the user can select a block with the mouse, and zoom in to view the summarization bitmap for a smaller number of rows. By continued clicking, the user can eventually zoom in until the block size is one row. Similarly, the user can zoom out.

Figure 6:
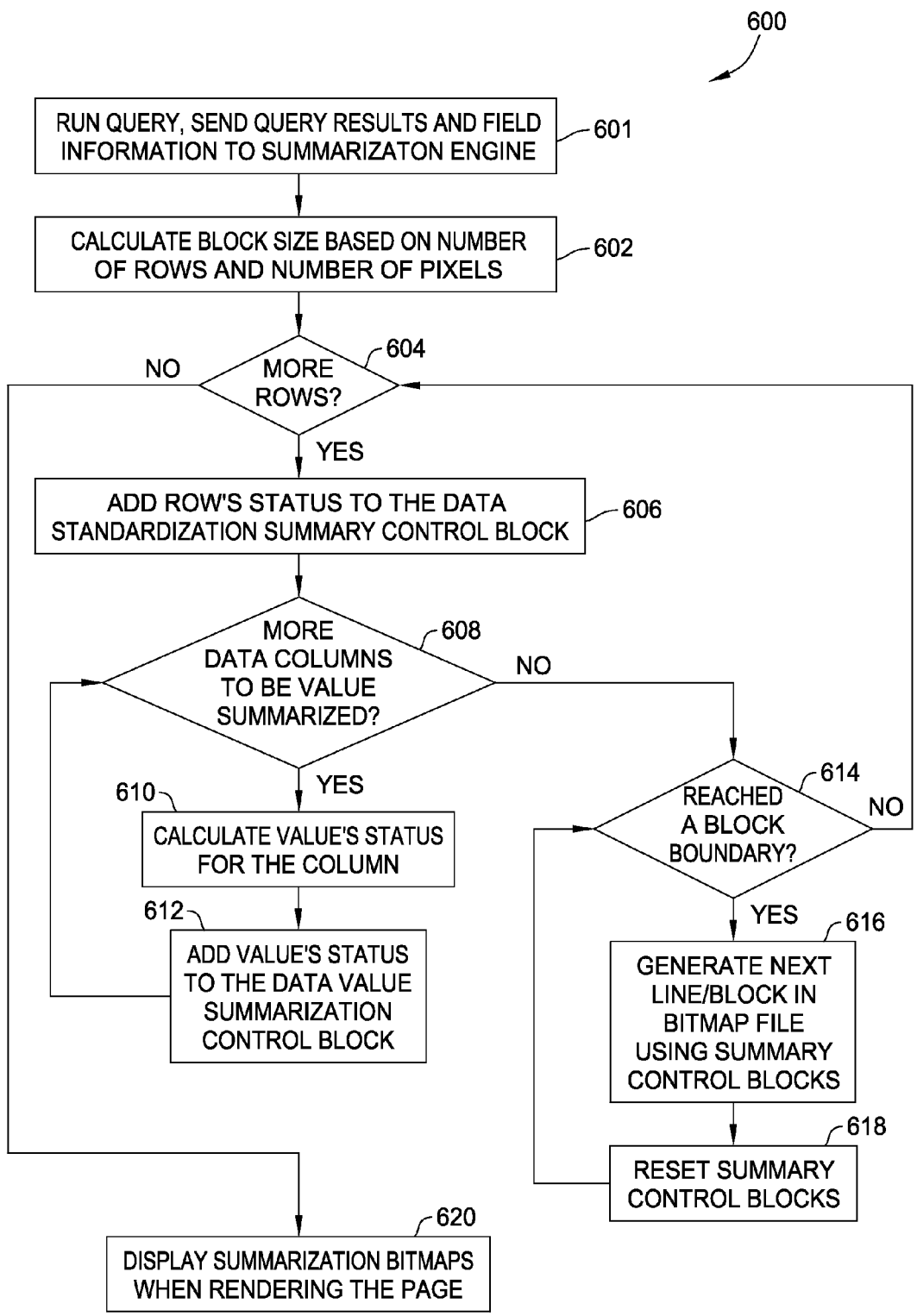
FIG. 6 is a flow diagram illustrating the process of generating a summarization display of missing rows, according to one embodiment of the invention.

FIG. 6 is a flow diagram illustrating a process 600 of generating a summarization bitmap, according to one embodiment of the invention. Illustratively, the process 600 is described with reference to the example illustrated in FIGS. 2-5.

Process 600 begins at step 601, where database server 120 receives a query from the client computer 110. The query is executed by the database engine 132 to retrieve results from the stored data 142. The query result set is returned to the summarization engine 134, along with field/column information from the data repository 148. As stated, the data repository 148 stores limits that are used by the summarization engine 134 to calculate discrete values (categories) for summarization bitmaps. For example, if the "age" column is selected by the user for data summarization, the limits in abstract data repository 134 for age might specify three categories: child (0-17), adult (18-55), and senior (over 56). The age ranges stored in the data repository 148 may be set by an application programmer or database administrator.

At step 602, a block size is calculated, based on the number of rows and the number of pixels used for the bitmaps. In the example of FIG. 5, the block size is one block per row of data included (or removed) from the result set. However, in large result sets, each block may represent multiple rows. For example, the summary bitmaps might represent 24,000 rows, with a block size of 75 rows (75 rows/block). Since 24,000/75 is 320, it would take a bitmap 320 pixels in height to represent the rows (one pixel vertically for each block of 75 rows).

At step 604, the summarization engine 134 determines whether there is another row in the result set to be used for creating summary blocks. Each summary block represents one or more rows from the database either removed (or included) in a display of query results based on data quality standards. In the simplest case, summary block represents a single row. Summary blocks may be created by the summarization engine 134 and stored in memory 126. The summary blocks store summarization data for each row in a block of the summarization bitmap 402. Once all the rows in a block are summarized, the next block in the bitmap file is generated. If there are no more rows to be processed, then the summarization bitmap file is complete. If, however, there are more rows to be processed, then at step 606 the next row's status (i.e. gold, silver, none) is added to the data standardization summary control block.

At step 608, the summarization engine 134 determines if data needs to be added to the data value summarization control block. If so, then step 610 calculates the status of the field/column value using the information obtained from the abstract data repository 134. For example, referring to FIG. 5, the "Hct % Bid" field is categorized as "Low" for values less than 15 and normal otherwise. Thus, a value of 7.4 would have a status value of "Low." At step 612, the value's status is added to the data value summarization control block. Next, the summarization engine 134 determines if any other columns need to be value summarized (step 608). If not, then the process 600 continues to step 614.

At step 614, the summarization engine 134 determines whether a block boundary has been reached. For example, if there are 75 rows per block, then a block boundary would be reached after row 75, 150, 225, etc. In a simpler case, where a block represents a single row, a block boundary as each row is processed. If a block boundary is reached, then the next block in the summarization bitmap file is generated (step 616). At step 618, the data in the summary control blocks is cleared, so the summarization engine 134 can begin to store data for the next block. If the end of the summary control block, or block boundary, has not yet been reached (step 614), then the process continues to step 604. At step 604, if there are no more rows, then the summarization bitmap file is complete and may be passed to the query interface for to be rendered and displayed to the user (step 620).

In one embodiment, a user may select a summary block representing multiple rows and "zoom" in on that summary block. To support the ability to zoom in on the data, process 600 can be implemented in several ways. One method is to use a block size of one, calculate the summarization control block information for each row, record and save that information, then each time a page is displayed, generate the bitmaps only based on the start row, end row, and block size using the already saved and calculated data. Another method is to reset the start row, end row, and block size and repeat the entire process using the data coming directly from the database. One skilled in the art would realize that, depending on the calculations required, and the amount and size of data, the methods have different performance characteristics.

While the foregoing is directed to embodiments of the present invention, other and further embodiments of the invention may be devised without departing from the basic scope thereof, and the scope thereof is determined by the claims that follow.

What is claimed is:

1. A computer-implemented method of graphically summarizing data in a query result, comprising:
   receiving a query result set, wherein the query result set includes a plurality of rows and a data quality value assigned to each row, wherein the data quality value indicates a quality of data in the row based on a data quality standard;
   receiving a request to remove rows containing data that fails to satisfy a predetermined data quality threshold;
   removing one or more rows from the query result set, wherein the assigned data quality value for each removed row fails to satisfy the predetermined data quality threshold;
   outputting for display at least a portion of the query result set, wherein the at least a portion of the query result set excludes the removed one or more rows;

generating, by operation of one or more computer processors, a summarization bitmap, wherein the summarization bitmap, bitmap includes a plurality of blocks each having a color and representing one or more rows of the query result set, and wherein for each block in the plurality of blocks, the color is a first color if the corresponding one or more rows are not displayed and were removed from the query result set because the assigned data quality value for at least one of the corresponding one or more rows failed to satisfy the predetermined data quality threshold, and wherein the color is a second color if the corresponding one or more rows are displayed; and outputting for display the generated summarization bitmap.

2. The method of claim 1, wherein each block represents a plurality of rows, and wherein the color of a given block represents a relative percentage of rows in the given block removed from the query result set to rows in the given block not removed from the query result set.

3. The method of claim 1, further comprising:
receiving categorization data used to assign a discrete categorization value to each row of the query result set;
generating a second summarization bitmap, wherein the second summarization bitmap includes a second plurality of blocks each representing one or more rows of the query result set and wherein a second color of a given block from the second plurality of blocks indicates the discrete categorization values assigned to the one or more rows corresponding to the given block; and
displaying the query result set as an initial result set on one or more pages.

4. The method of claim 3, wherein each block of the second summarization bitmap represents a plurality of rows, and wherein the color of a given block represents a relative percentage of rows in the given block assigned a given one of the discrete categorization values.

5. The method of claim 1, further comprising displaying a graphical indicator that indicates the location of the rows of the query result being displayed to a user, relative to all rows of the target result.

6. The method of claim 1, wherein, in response to a user selecting a given block, the summarization bitmap is regenerated to represent only the rows in the given block.

7. The method of claim 1 further comprising:
receiving a selection of a given column of the query result set to use in sorting the rows of the query result set;
sorting the displayed rows of the query result, based on the selected column; and
regenerating the summarization bitmap, wherein the regenerated summarization bitmap reorders the block to reflect the same order of displayed rows sorted according to the selected column.

8. A computer-readable storage medium containing a program which, when executed, performs an operation for graphically summarizing data in a query result set, the operation comprising:
receiving a query result set, wherein the query result set includes a plurality of rows and a data quality value assigned to each row, wherein the data quality value indicates a quality of data in the row based on a data quality standard;
receiving a request to remove rows containing data that fails to satisfy a predetermined data quality threshold;
removing one or more rows from the query result set, wherein the assigned data quality value for each removed row fails to satisfy the predetermined data quality threshold;

outputting for display at least a portion of the query result set, wherein the at least a portion of the query result set excludes the removed one or more rows;
generating a summarization bitmap, wherein the summarization bitmap includes a plurality of blocks each having a color and representing one or more rows of the query result set, and wherein for each block in the plurality of blocks, the color is a first color if the corresponding one or more rows are not displayed and were removed from the query result set because the assigned data quality value for at least one of the corresponding one or more rows failed to satisfy the predetermined data quality threshold, and wherein the color is a second color if the corresponding one or more rows are displayed; and
outputting for display the generated summarization bitmap.

9. The computer-readable storage medium of claim 8, wherein each block represents a plurality of rows, and wherein the color of a given block represents a relative percentage of rows in the given block removed from the query result set to rows in the given block not removed from the query result set.

10. The computer-readable storage medium of claim 8, wherein the operation further comprises:
receiving categorization data used to assign a discrete categorization value to each row of the query result set;
generating a second summarization bitmap, wherein the second summarization bitmap includes a second plurality of blocks each representing one or more rows of the query result set and wherein a second color of a given block from the second plurality of blocks indicates the discrete categorization values assigned to the one or more rows corresponding to the given block; and
displaying the query result set as an initial result set on one or more pages.

11. The computer-readable storage medium of claim 10, wherein each block of the second summarization bitmap represents a plurality of rows, and wherein the color of a given block represents a relative percentage of rows in the given block assigned a given one of the discrete categorization values.

12. The computer-readable storage medium of claim 8, wherein the operation further comprises, displaying a graphical indicator that indicates the location of the rows of the query result being displayed to a user, relative to all rows of the target result.

13. The computer-readable storage medium of claim 8, wherein, in response to a user selecting a given block, the summarization bitmap is regenerated to represent only the rows in the given block.

14. The computer-readable storage medium of claim 8, further comprising:
receiving a selection of a given column of the query result set to use in sorting the rows of the query result set;
sorting the displayed rows of the query result, based on the selected column; and
regenerating the summarization bitmap, wherein the regenerated summarization bitmap reorders the block to reflect the same order of displayed rows sorted according to the selected column.

15. A system, comprising:
a database;
a processor; and
a memory containing a database program, which when executed on the processor, performs an operation for graphically summarizing data in a query result, the operation comprising:

receiving a query result set, wherein the query result set includes a plurality of rows and a data quality value assigned to each row, wherein the data quality value indicates a quality of data in the row based on a data quality standard;

receiving a request to remove rows containing data that fails to satisfy a predetermined data quality threshold;

removing one or more rows from the query result set, wherein the assigned data quality value for each removed row fails to satisfy the predetermined data quality threshold;

outputting for display at least a portion of the query result set, wherein the at least a portion of the query result set excludes the removed one or more rows;

generating a summarization bitmap, wherein the summarization bitmap includes a plurality of blocks each having a color and representing one or more rows of the query result set, and wherein for each block in the plurality of blocks, the color is a first color if the corresponding one or more rows are not displayed and were removed from the query result set because the assigned data quality value for at least one of the corresponding one or more rows failed to satisfy the predetermined data quality threshold, and wherein the color is a second color if the corresponding one or more rows are displayed; and outputting for display the generated summarization bitmap.

16. The system of claim 15, wherein each block represents a plurality of rows, and wherein the color of a given block represents a relative percentage of rows in the given block removed from the query result set to rows in the given block not removed from the query result set.

17. The system of claim 15, wherein the operation further comprises:

receiving categorization data used to assign a discrete categorization value to each row of the query result set;

generating a second summarization bitmap, wherein the second summarization bitmap includes a second plurality of blocks each representing one or more rows of the query result and wherein a second color of a given block from the second plurality of blocks indicates the discrete categorization values assigned to the one or more rows corresponding to the given block; and displaying the query result set as an initial result set on one or more pages.

18. The system of claim 17, wherein each block of the second summarization bitmap represents a plurality of rows, and wherein the color of a given block represents a relative percentage of rows in the given block assigned a given one of the discrete categorization values.

19. The system of claim 15, wherein the operation further comprises, displaying a graphical indicator that indicates the location of the rows of the query result being displayed to a user, relative to all rows of the target result.

20. The system of claim 15, wherein, in response to a user selecting a given block, the summarization bitmap is regenerated to represent only the rows in the given block.

21. The system of claim 15, further comprising:

receiving a selection of a given column of the query result set to use in sorting the rows of the query result set;

sorting the displayed rows of the query result, based on the selected column; and regenerating the summarization bitmap, wherein the regenerated summarization bitmap reorders the block.

* * * * *